Patented Mar. 4, 1952

2,588,083

UNITED STATES PATENT OFFICE 2,588,083

ORGANOSILICON ALDEHYDES AND METHODS OF PREPARING THE SAME

Charles A. Burkhard, Alplaus, and Dallas T. Hurd, Schenectady, N. Y., assignors to General Electric Company, a corporation of New York No Drawing. Application June 1, 1950, Serial No. 165,592

10 Claims. (Cl. 260—448.2)

This invention relates to novel organosilicon compounds and methods of preparing same. More particularly the invention is concerned with a method for preparing organosilicon aldehydes, which comprises effecting reaction between a mixture of ingredients comprising an alkenylsilicon composition, e. g., an alkenylpolysiloxane or an alkenylsilane, carbon monoxide and hydrogen in the presence of a formylizing catalyst for the reaction capable of effecting addition of the aldehydic group

to the terminally unsaturated portion of the alkenylsilicon composition.

It has been known heretofore that carbon monoxide and hydrogen can be caused to react with olefins in a reaction known as the "Oxo" process to add a formyl radical

to the olefin to give aliphatic aldehydes. This reaction is conducted in the presence of, for instance, a carbonyl of cobalt, or cobalt in a form that may yield the carbonyl under the conditions of the reaction. Such a reaction is described in Journal of the American Chemical Society, 70, 383 (1948) by Adkins and Krsek. In such a reaction it has been found that two theoretically possible isomeric aldehydes are formed attended by very little side reaction products; no aldol condensation products are formed in reactions using olefins.

We have now discovered that we are able to prepare organosilicon aldehydes for the first time by effecting reaction between an alkenylpolysiloxane or an alkenylsilane, e. g., an alkenylsilane corresponding to the general formula:

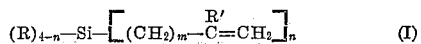 (I)

with carbon monoxide and hydrogen in the presence of a carbonyl of cobalt, or a cobalt compound or cobalt itself capable of forming the carbonyl thereof under the conditions of the reaction. In the above general formula R may be a monovalent hydrocarbon radical, R' is either hydrogen or the methyl radical, $m$ is one of the following: 0, 1; and $n$ is an integer equal to from 1 to 3, inclusive.

Thus R may be, for instance, an alkyl radical, for example, methyl, ethyl, propyl, isopropyl, butyl, hexyl, dodecyl, etc., radicals; an aryl radical, for example, pheyl, diphenyl, anthracyl, etc., radicals; an alkaryl radical, for example, tolyl, xylyl, ethylphenyl, methylnaphthyl, etc., radicals; aralkyl radicals, for example, benzyl, phenylethyl, etc., radicals; cycloaliphatic radicals, for example, cyclopropane, cyclobutane, cyclohexane, cyclopentane, etc. radicals; heterocyclic radicals, for example, furyl, pyridyl, pyrimidyl, thienyl, etc. radicals. R may also be substituted with non-reactive substituents, e. g., halogens, etc. Preferably though not essentially R is advantageously free of aliphatic unsaturation in order that the reaction with the carbon monoxide and hydrogen does not lead to products which are too difficulty separable, and is preferably a lower alkyl group containing, for example, from 1 to 4 carbon atoms, and $n$ is preferably 1 or 2.

It will, of course, be apparent to those skilled in the art that we do not intend to be limited to these values for R and $n$, and that other values and radicals assigned to the symbols may be employed, as pointed out above.

The reaction with an alkenylsilane appears to go differently in the presence of the carbon monoxide and hydrogen than occurs in the case of using an olefin free of silicon. As pointed out above, reaction mixtures employing olefins give two theoretically possible isomeric aldehydes. In contrast to this, the alkenylsilanes react with carbon monoxide and hydrogen in the presence of, for example, the cobalt carbonyl, to give not only aldehydes but considerable quantities of other products, particularly aldol condensation products, and in certain cases give products resulting from the hydrolysis of the silicon-carbon bond attached to the organic radical containing the carbonyl group to the silicon atom. It is therefore apparent that our reaction differs from that disclosed in the prior art in connection with olefins alone and the results obtained by us could in no way have been predicted knowing of such prior reactions.

Generally, the compounds obtained in accordance with the practice of our invention using alkenylsilanes described above may be considered as coming within the general formula:

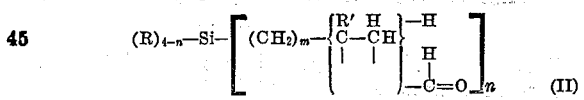 (II)

where R, R', $m$, and $n$ have the meanings given above. As will be apparent from Formula II, the formyl radical (—CHO) can add to either of the two carbon atoms constituting the olefinic unsaturation. Generally, we prefer to employ as a catalyst for the reaction such formylizing compositions as, for example, cobalt carbonyl, finely divided freshly reduced cobalt metal, which is converted to the carbonyl of cobalt under the conditions of the reaction, etc.

The reaction is preferably conducted under superatmospheric pressure due to the physical properties of the carbon monoxide and hydrogen. Heating of the reaction mass in a pressure reactor at temperatures ranging, for example, from about 25° to 150° C. or higher for varying lengths of time is desirable in order to accelerate the action. Higher temperatures, of course, will increase the rate of reaction while lower temperatures will slow it down in accordance with the well-known laws of chemical reaction. We have found that a good temperature range for heating the reactants is from about 50° to 140° C. for times varying, for instance, from about 2 to 10 or more hours depending, for instance, on the temperature used, the alkenylsilicon composition employed, the pressure within the reactor, etc.

In order that those skilled in the art may better understand how the present invention may be practiced, the following examples are given by way of illustration and not by way of limitation.

In the following examples the formylizing catalyst comprised a benzene solution of cobalt carbonyl. The latter was prepared by reducing cobalt powder in hydrogen at 450° C., and then treating the reduced material in the form of a benzene suspension with carbon monoxide and hydrogen (3 to 1 ratio) at a total pressure of about 2400 p. s. i. at 150° C. for 6 hours. The resulting dark red benzene solution was filtered and used as the cobalt carbonyl solution in the examples below.

Example 1

To an Aminco pressure reactor was charged 40 grams allyltrimethylsilane in 60 grams of ethyl ether. Thereafter carbon monoxide and hydrogen under a total pressure of 3200 p. s. i. (the gas mixture comprising 1800 p. s. i. carbon monoxide and 1400 p. s. i. hydrogen) was added to the pressure reactor in the presence of a small amount of the above-prepared cobalt carbonyl solution. The reactor was then heated at temperatures of about 115° to 125° C. for 4 hours. At the end of this time the pressure had dropped to 900 p. s. i. and the reaction mixture was removed and fractionally distilled to yield about 14 grams of a mixture comprising a trimethylsilylbutyraldehyde of which half was the monomeric aldehyde $$\left[(CH_3)_3Si-CH_2-\underset{CH_3}{\overset{H}{C}}-\overset{H}{C}=O\right]$$

and the other half comprised the dimeric aldehyde of trimethylsilylbutyraldehyde of which one isomer has the formula $$(CH_3)_3-Si-CH_2-CH_2-CH_2-\underset{H\overset{|}{C}=O}{\overset{H}{C}}=C-CH_2-CH_2-Si(CH_3)_3$$

The monomeric compound was found to have a boiling range of from 73.5 to 74° C. at 22 mm., had a refractive index $n_D^{20}$ 1.4239, and a density $d_4^{20}$ 0.8459. The dimeric trimethylsilylbutyraldehyde had a boiling point of about 150°–154° C. at 75 mm., a refractive index $n_D^{20}$ 1.4550 and a density $d_4^{20}$ 0.8910. Analysis of the monomeric derivative showed it to contain C=58.7%, H=10.7%, MR$_D$=43.5 (calculated C=58.28%, H=11.18%, MR$_D$=43.8). Analysis of the dimeric derivative showed it to contain C=60.8%, H=9.6%, and MR$_D$=86.2 (calculated C=62.16%, H=11.18%, MR$_D$=85.4). The 2,4-dinitrophenylhydrazones of the monomeric and dimeric trimethylsilylbutyraldehydes were found to check very closely with the calculated values for such derivatives. It is also possible to prepare the other isomeric trimethylsilylbutyraldehyde $$\left[(CH_3)_3Si-(CH_2)_3-\overset{H}{C}=O\right]$$

by similar means.

Example 2

Trimethylvinylsilane was prepared by making an ethereal solution of methyl magnesium bromide by effecting reaction between methyl bromide with 96 grams of magnesium turnings in two liters of anhydrous ethyl ether. The methyl bromide was added until the magnesium had been consumed. At this point 180 grams vinyltrichlorosilane was added dropwise while the mixture was heated under reflux. The trimethylvinylsilane and ether were recovered by distillation from the magnesium salt up to a temperature of 90° C. Rectification gave 36 grams of trimethylvinylsilane, boiling point 54–55° C., $d_4^{20}$ 0.7038, $n_D^{20}$ 1.3909, MR$_D$ found 33.8 (calculated 34.20). Analysis of this compound showed it to contain 58.3% carbon and 12.0% hydrogen (calculated carbon 59.92%, and hydrogen 12.07%).

The carbonylation of trimethylvinylsilane was conducted as follows: Trimethylvinylsilane (35 grams) was placed in an Aminco pressure reaction vessel together with 100 ml. of dry ethyl ether and 12 ml. of the above-prepared stock solution of cobalt carbonyl. The reaction vessel was pressurized with 1200 p. s. i. hydrogen and 1800 p. s. i. carbon monoxide (total pressure 3000 p. s. i.) and heated to 125° C. for 5 hours. At the conclusion of this time, the pressure had fallen to about 1000 p. s. i. The mixture removed from the vessel had an intense aldehyde odor and gave a positive test with fuchsin aldehyde reagent.

A second run was conducted in which 40 grams trimethylvinylsilane dissolved in 120 ml. dry ethyl ether and 12 ml. of cobalt carbonyl solution were placed in the above-described pressure reactor. The vessel was pressurized to a total pressure of 2200 p. s. i. of hydrogen and carbon monoxide (1 to 2) and the reaction mixture heated at a temperature of 115° C. for 3 hours. During this time the pressure fell to about 300 p. s. i. The reaction mixture was filtered into a distillation flask and the products were distilled rapidly, making certain that the cobalt carbonyl was decomposed. This flash distillation product then was redistilled. Ether, benzene and unreacted trimethylvinylsilane were removed by gently heating the flask so that the liquid temperature did not exceed 90° C. and the vapor temperature did not exceed 75° C. The distillate so obtained gave a negative aldehyde test with fuchsin aldehyde reagent. The remainder of the liquid then was distilled under vacuum to yield the following products: (a) one trimethylsilylpropionaldehyde, boiling point 61°–64° C. at 25 mm., $n_D^{20}$ 1.4238, $d_4^{20}$ 0.8347; (b) another trimethylsilylpropionaldehyde, boiling point 62°–65° C. at 10 mm., $n_D^{20}$ 1.4252, and $d_4^{20}$ 0.8365; and (c) an aldol condensation product boiling over the range of 194°–209° C. at 8 mm., $n_D^{20}$ 1.4549. Analysis of the trimethylsilylpropionaldehyde (a) showed it to contain 55.6% carbon and 11.2% hydrogen (calculated carbon 55.33% and hydrogen 10.84%); trimethylsilylpropionaldehyde (b) contained 57.2% carbon and 10.5% hydrogen; while the aldol condensation product (c) contained 55.1% carbon and 10.8% hydrogen. It will be apparent that one trimethylsilylpropionaldehyde isomer has the formula

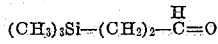

and the other isomer has the formula

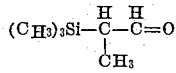

The 2,4-dinitrophenylhydrazones of the monomeric aldehydes were prepared and found to have the following melting points. The derivative from the two monomeric aldehydes had a boiling point, respectively, of around 131°–132° C. and 129°–130° C. (mixed 126°–130° C.) while analysis thereof showed the derivatives to contain 18.1% and 18.9% nitrogen respectively (calculated for $C_{12}H_{18}SiN_4O_2=18.17\%$). These results indicate conclusively that two isomeric trimethylsilylpropionaldehydes were obtained, probably, the two corresponding to the formula

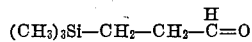

and

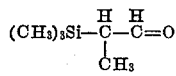

*Example 3*

An organopolysiloxane was prepared by cohydrolyzing allylmethyldichlorosilane and dimethyldichlorosilane in the proper molar ratios to obtain a R/Si ratio of 2.0 wherein the allyl groups comprised 10 mol percent of the total number of organic groups. This organopolysiloxane was charged to a pressure reaction vessel together with carbon monoxide, hydrogen, ether, and benzene in the presence of cobalt carbonyl, and heated until further drop in pressure ceased. Analysis of the resulting product showed it to contain aldehyde groups. It was not possible to isolate simple pure compounds from this material since the prepared compositions were of too high molecular weight. However, it was definitely shown that aldehyde groups were present in the silicone oil.

It will, of course, be apparent to those skilled in the art that other alkenylpolysiloxanes may be employed in place of the organopolysiloxanes used above, for example, vinyl, allyl or methallyl groups, either alone or with other organic groups attached to the silicon atoms by C—Si linkages, as, e. g., hydrocarbon groups, for instance alkyl (e. g., methyl, ethyl, propyl, butyl, etc.), aryl (e. g., phenyl, naphthyl, biphenyl, etc.), alkaryl (e. g., tolyl, xylyl, etc.), aralkyl (e. g., benzyl, phenylethyl, etc.), cycloaliphatic, heterocyclic, etc., radicals, preferably, but not essentially, free of olefinic unsaturation, without departing from the scope of the invention. Also the ratio of total organic groups to silicon atoms in the organopolysiloxane may also be varied widely, for instance, from 1 to 3 organic groups per silicon atom.

The above mentioned organosilicon aldehydes are useful for many purposes. One application comprises preparing phenolic-type or Bakelite condensation products of these aldehydes with phenols or derivatives of phenol. For example, when about 10 parts by weight trimethylsilylpropionaldehyde and 5 parts by weight resorcinol were mixed together and to this was added about 0.1 part camphorsulfonic acid, and this mixture heated gently, it was found that the mixture thickened and the color changed from colorless to a dark red at which time it was noted that the mixture was extremely viscous. It solidified on cooling and when the product was analyzed, it was found to contain 14.6% silicon. The addition of a small amount of 40% aqueous formaldehyde yielded a resin having the characteristic properties of a phenol-aldehyde resin. The addition of paraformaldehyde to the product of condensation of trimethylsilylpropionaldehyde and resorcinol gave a more viscous resin than was obtained previously.

In addition to the use of our claimed organosilicon aldehydes for making various resins with different types of phenols, ureas, melamines, etc., it is possible to prepare alcohols, acids, acid chlorides, amides, or other products as derivatives from these organosilicon aldehydes. It has been found that the aldehydes themselves have a very pleasant odor which may make them of value in their use as perfumes or flavors.

What we claim as new and desire to secure by United States Letters Patent is:

1. A composition of matter corresponding to the general formula:

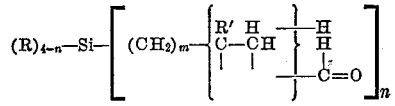

where R is a monovalent hydrocarbon radical free of aliphatic unsaturation and selected from the class consisting of alkyl, aryl, alkaryl, aralkyl, saturated cycloaliphatic, and heterocyclic radicals, R' is selected from the class consisting of hydrogen and the methyl group, m is one of the following 0, 1; and n is an integer equal to from 1 to 3 inclusive.

2. A composition of matter corresponding to the formula:

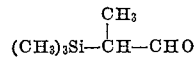

3. A composition of matter corresponding to the formula:

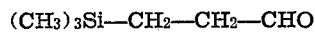

4. A composition of matter corresponding to the formula:

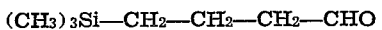

5. A composition of matter corresponding to the formula:

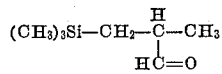

6. The process which comprises effecting reaction in the presence of a formylizing agent selected from the class consisting of a cobalt carbonyl, and cobalt metal and compounds of cobalt which under the conditions of the reaction form a cobalt carbonyl, between an alkenyl-silicon composition selected from the class consisting of alkenylpolysiloxanes and an alkenylsilane corresponding to the general formula:

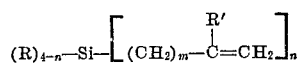

where R is a monovalent hydrocarbon radical free of aliphatic unsaturation and selected from the class consisting of alkyl, aryl, alkaryl, aralkyl, saturated cycloaliphatic, and heterocyclic radicals, R' is selected from the class consisting of hydrogen and the methyl radical, m is one of the following: O, 1, and $n$ is an integer equal to from 1 to 3 inclusive, carbon monoxide and hydrogen.

7. The process for making an organosilicon aldehyde which comprises effecting reaction in the presence of cobalt carbonyl of a mixture of ingredients comprising trimethylvinylsilane, carbon monoxide, and hydrogen.

8. The process for making an organosilicon aldehyde which comprises effecting reaction in the presence of cobalt carbonyl of a mixture of ingredients comprising trimethylallylsilane, carbon monoxide, and hydrogen.

9. The process for preparing organosilicon aldehydes which comprises effecting reaction between a mixture of ingredients comprising (1) an alkenylpolysiloxane, (2) carbon monoxide, and (3) hydrogen, in the presence of a formylizing agent selected from the class consisting of a cobalt carbonyl, and cobalt metal and compounds of cobalt which under the conditions of the reaction form a cobalt carbonyl.

10. The process which comprises effecting reaction under the influence of heat in the presence of a formylizing agent selected from the class consisting of a cobalt carbonyl, and cobalt metal and compounds of cobalt which under the conditions of the reaction form a cobalt carbonyl, between a mixture of ingredients comprising (1) an allylmethyl polysiloxane containing silicon-bonded allyl groups, (2) carbon monoxide, and (3) hydrogen to produce an organopolysiloxane containing aldehydic groups attached to the terminally unsaturated portion of the allylmethyl polysiloxane.

CHARLES A. BURKHARD.
DALLAS T. HURD.

REFERENCES CITED

The following references are of record in the file of this patent:

UNITED STATES PATENTS

| Number | Name | Date |
|---|---|---|
| 2,327,066 | Roelen | Aug. 17, 1943 |